(12) United States Patent
Nohren, Jr.

(10) Patent No.: US 8,439,205 B1
(45) Date of Patent: May 14, 2013

(54) PORTABLE UNIVERSAL FLOW FILTER

(76) Inventor: John E. Nohren, Jr., St. Petersburg, FL (US)

( * ) Notice: Subject to any disclaimer, the term of this patent is extended or adjusted under 35 U.S.C. 154(b) by 0 days.

(21) Appl. No.: 13/317,762

(22) Filed: Oct. 27, 2011

Related U.S. Application Data

(63) Continuation-in-part of application No. 11/765,137, filed on Jun. 19, 2007, now abandoned.

(60) Provisional application No. 60/814,557, filed on Jun. 19, 2006.

(51) Int. Cl.
*B01D 24/00* (2006.01)
*B01D 29/00* (2006.01)
*B01D 29/88* (2006.01)
*B01D 35/02* (2006.01)
*B01D 27/00* (2006.01)

(52) U.S. Cl.
USPC ........ 210/464; 210/416.3; 210/266; 210/282; 210/474; 210/477; 210/466; 210/467; 210/468; 210/483; 210/502.1

(58) Field of Classification Search .................. None
See application file for complete search history.

(56) References Cited

U.S. PATENT DOCUMENTS

| | | | | |
|---|---|---|---|---|
| 6,153,096 | A * | 11/2000 | Nonren, Jr. | 210/238 |
| 6,165,362 | A * | 12/2000 | Nohren et al. | 210/266 |
| 6,221,416 | B1 * | 4/2001 | Nohren, Jr. | 426/394 |
| 7,473,362 | B1 * | 1/2009 | Nohren, Jr. | 210/321.64 |

* cited by examiner

*Primary Examiner* — Benjamin Kurtz

(57) ABSTRACT

A monolithic carbon composite filter for use in water filter bottles of the type having a bottle cap and a valved vented top. The filter is formed with exposed surfaces including side walls and a base. The filter employs both radial flow through the side walls of the filter and axial flow through the filter base. All available exposed surfaces thus maximize the available surface area for filtering water. As a result a larger diameter filter suited to the addition of a second media as well as an inner tube providing for separate axial flow may be utilized. A dual aspect or universal flow filter adapted to be attached to a filter housing top is capable of being cooperatively attached to the bottle cap and bottle with a valved vented top. The bottle is normally inverted for drinking.

4 Claims, 6 Drawing Sheets

PORTABLE UNIVERSAL FLOW FILTER

CROSS-REFERENCES TO RELATED APPLICATIONS

This application is a continuation-in-part of application Ser. No. 11/765,137 filed Jun. 19, 2007, now abandoned, which, in turn, is a non-provisional application of U.S. Provisional Patent Application Ser. No. 60/814,557, filed Jun. 19, 2006, now abandoned, the entire content of which applications is herein incorporated by reference.

STATEMENT REGARDING FEDERALLY SPONSORED RESEARCH OR DEVELOPMENT (NOT APPLICABLE)

BACKGROUND AND SUMMARY OF THE INVENTION

The purpose of this invention is to provide consumers with a greatly enhanced water treatment bottle capable of both rendering the water free of common contaminants while enhancing health giving properties through enhanced alkalinity as well as reduction in the oxidation and reduction potential. In so doing several natural minerals are introduced to the water including calcium, magnesium, and potassium. In so doing the product of this invention competes favorably in performance with the countertop electrolytic cell "ionizers" which are marketed in the $3,000 range. A secondary goal of the subject invention is to provide a versatile basic product adaptable to other secondary medias to meet specific needs as will be discussed within the body of this document. Also, to provide a basic carbon based filter which retains sufficient treated water to have the first drink instantly available without the necessity of evacuating the filter of air and drawing the water through.

To successfully accommodate a secondary media it is frequently necessary to alter the water flow characteristics. In other words while the influent water may simply pass through the carbon filter walls using radial and axial flow, sufficient contact time may not be attained if immediately passed through a second media providing the same residence time. Thus, a redirection of flow of the initially treated water may be required prior to contact with the second water treatment media in order to provide an axial flow through a longer column of media enhancing contact time. This frequently is desirable when using a granular media, as well as when constituents such as minerals are being added to the water.

It should also be noted that to be successful the water filter product must be user friendly which dictates a design with low pressure drop, an easy and free flow of treated water without effort on the part of the user. In addition the ability to remove the major contaminants including chlorine, and lead as a heavy metal, are deemed essential. The product design herein presented which is now entering production accomplishes the above including the integration of two media and enhanced flow and residence time through the use of all external surfaces of the external monolithic carbon composite filter, sides and base, thus providing dual flow both radially through the side walls as well as axially through the outer filter base. To achieve performance the carbon composite block has a porosity retained primarily between 20 and 30 microns and contains a polyester binder and 30%-60% activated carbon and 15%-25% zeolite for heavy metal removal. Flow rate is preferably at 10 psi under a pressure of 1-2 psi when placed into service. The performance characteristics are improved by means of making all external filter surfaces available to perform the filtration function.

The available portable filtration products in the past have either been carbon block filters with a rather narrow hollow central core, the base of which is either blocked by a plate containing a relief valve extending through the base, or simply closed off at the base, designed only for the radial flow of water through the sides of the filter. Conversely, granular activated carbon filters have been used but are adaptable only to use in an axial flow configuration. In the case of radial flow designed filters; the length of the filter is maximized for radial surface area. The hollow center core is generally narrow, and a relatively small exit port is provided, generally of about ¼ inch, or less, and acts as a flow restrictor. By increasing the overall diameter of the filter, making the base of the filter available for filtration, it is practical to shorten the filters length without reducing performance by making all external surfaces of the filter designed and available for filtration. Flow is enhanced as a reservoir is created within the large open filter center, and minimal resistance to flow can be created by providing unrestricted access to a larger water exit port. By encapsulating the filter within a closed housing, open for water access only at the top, in a bottle top mounted filter, water can be directed to all external surfaces regardless of the amount of water remaining in the bottle until practically empty. Typically, a space for water flow between 0.040" and 0.100" is preferred between the housing side walls as well as the housing base and the contained external carbon composite filter surfaces. This spacing is preferred for the water flow channels to eliminate much of the boundary layer attraction which impedes flow and increases pressure requirements Filters of this type encapsulated within a housing with water access ports near the top of the filter also minimize the water remaining in the bottle, not available for removal by the filter. Hence, even when the design is adapted to a single treatment media, such as a monolithic carbon composite carbon block, flow and contaminant reduction is enhanced with reduced back pressure by a filter utilizing both axial and radial flow characteristics, combined with an outer housing which directs the water to all external filter surfaces. The housing is designed to also permit the maximum amount of water to be removed efficiently from the bottle without the intrusion of air. This is accomplished by retaining water within the filter void within the housing at the conclusion of each average drinking cycle.

This type of filter, preferably encapsulated within an outer housing, is mechanically and cooperatively connected to the bottle top forming a single assembly with the top and the bottle. The filter may also be designed to attach to the top of the bottle neck by means of a supporting flange and secured in place by the bottle top with which it operates cooperatively. For maximum convenience and efficiency the filter is mechanically fastened to the valved bottle top eliminating the need to handle the filter and bottle top separately when the bottle is opened and refilled. The third option is to place an open base filter on a tube or straw suspended to the base of the bottle permitting drinking without the need to invert the bottle. All of these alternative designs have been described in the drawings.

There are two basic concepts with several options flowing from each. The first is a carbon composite filter with an exposed base the outer surface of which is totally exposed to the inner wall areas of the housing and base. The filter is contained within the housing with water entry ports positioned near the top of the filter so that even with little water contained within the bottle covering less than ⅓rd of the filter, the entire housing is filled with water and the base of the carbon filter still functions as a filtration medium. This is accomplished by containing the filter entirely within the outer housing, The drawings show and describe the product in an easily understood graphic depiction.

By offsetting the filter from the sides and bottom of the housing by 0.40"-0.10" to provide an unobstructed and free flowing water passage to all vertical and lateral filter surfaces all functions are markedly improved. The base of the filter is offset from the base of the housing in a manner that permits the water to flow within the housing along the sides to the base with equal pressure to penetrate the base as well as the side walls. Thus, we have created a Dual or Universal Flow Filter.

To further enhance this invention, the housing containing the filter becomes a leak proof cup, with water access openings only at the top, which retains the water within the filter and housing after the first use when the filter housing is attached to the bottle top. Alternately, if an encapsulating housing is not employed the filter may be coated on the interior with highly porous Teflon or similar coating possessing a negative angle of wetting which the water does not penetrate flowing back into the bottle when static, under the force of gravity alone. This is highly advantageous as it leaves a large reservoir of water to flow out unimpeded to the user on demand. The coating does not impede the flow of water across the filter into the filter's center under normal operating pressure of 1-2 psig. This is particularly useful if the filter is positioned on a tube ("straw") at the base of the bottle, with the housing base and water intake open at the bottom rather than the top. The Teflon coating is also beneficial if the bottle is to be laid on its side, precluding water from seeping out into the housing and then into the bottle through the water inlet ports.

Another major advantage of the increased filter diameter is the center void which may also be used to add a second media. This may be done either by simply placing the second media within the hollow filter center and adding a retaining screen, or by incorporating a center tube attached to the top of the filter housing extending to the inner base of the carbon filter with a water access opening. At the base of the center tube openings, screened if required, permit the entry of the initially treated water into the base of the center tube for axial flow through the length of the media retained within the center tube. A screen is positioned between the exit end of the inner tube and bottle top exit valve to retain the second media.

The filter housing is preferably threaded into a mating receptacle in the cap. This permits a much larger diameter opening than is commonly found, and also a means to permit the water to flow freely without mechanical constriction through the water delivery orifice, the valve. In one top design a rigid plastic tube of some 5/16th to 1/2" is used, and closed off by any one of a variety of means including a rotating ball valve. As a result of the relatively large open center within the dual flow filter, this carbon composite element may also be used to house impregnated porous plastic beads or cylindrical elements to elute a flavor to the water passing through. A variety of secondary medias may also be incorporated for the purpose of VOC removal, Arsenic removal, Nitrate removal, or to add minerals to the water. When a defined period of contact is required, such as when alkalizing and mineralizing the water, it is desirable to use the center tube design within the dual flow filter providing only an axial flow over the entire secondary media bed contained within the center tube. When the center tube is employed, preferably a component of the housing top a 0.04"-0.10" space between the inner walls of the external filter and external wall of the inner tube are preferred to enhance water flow to the entry or transfer point at the base of the inner tube. When the required flow rate, typically 10 ml/sec together with the performance or results required specify an extended residence time of the water in contact with the media then the diameter and length of the inner center tube become a dominant factor in the design criteria. As an example an inner tube of 0.73 in diameter and 2.4 in length is used to hold 8 grams of ceramic alkalizing media in an available volume of 4.2 cubic inches. With the media thusly sized and contained water is alkalized from a pH of 7 to a pH of 9.5 while reducing the ORP (oxidation reduction potential) by ~400 points at a flow rate of 10 ml/sec; the design flow rate. The health benefits of consuming alkaline water are well documented in the literature.

Due to the construction and water flow it can also be desirable for those seeking the greatest bio availability of water for hydration to incorporate magnets arranged on opposite sides of the carbon element, preferable using four opposed magnets; with two having South facing South polarity, and the second set with North facing North polarity for the purpose of de-clustering the filtered water. Optimum results are obtained by employing four neodymium N45 magnets with a ~4300 gauss rating, as a slightly less effective alternative; N35 magnets with a gauss rating of ~3800 can be used.

One additional technology may be gainfully combined with the afore described dual aspect filter. Charged Layered Membrane technology (CLM) employing a ~50 mV positive electric charge potential to attract and retain negatively charged particulate matter and biological contaminants. The charge potential is created by bonding nano glass fibers to micro glass fibers contained within a cellulosic bed 0.8-1.2 mm thick including top and bottom layers of fine highly porous polyester scrim. The void volume of the CLM sheet is from 70-90 percent with the pore size from 1 micron, preferred, to ~2 microns. The charge spans the normal 1-2 micron pore effectively capturing the negatively charged contaminants and dipoles. Media of this nature is commercially available from the Ahlstrom Corporation under the trade name Disrupter®. This media is available with fine activated carbon as a component ~34% by weight, with other water treatment compounds, or as a product without additional additives as used in the application covered by the attendant drawing.

DETAILED DESCRIPTION OF PREFERRED EMBODIMENTS

Figure 1:
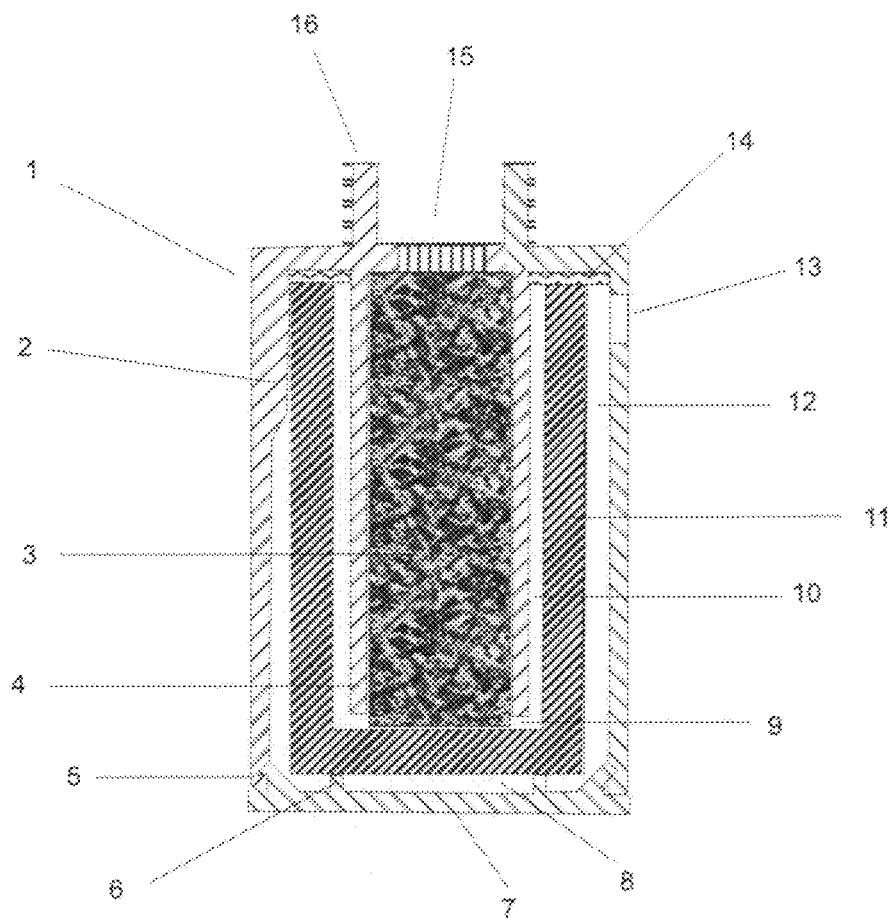
FIG. 1: Shows an external filter housing within which an inner tube open at the base, extends from the top of the housing; the housing contains a carbon composite filter with the side walls and base equally exposed to influent water; the center tube containing a second media subject to full axial flow such as for increasing the alkalinity of the water from a nominal pH of 7 to a pH of ~9.

FIG. 1: The filter assembly shown in FIG. 1 combines several functions in unique manners; the filter combines a carbon composite filter 11 with dual water flow, the water flowing radially through the carbon filter 11 sides as well as axially through the filter base. The filter 11 is supported within housing 1, and assembled base plate 7 with three filter supporting and offset pins 6 and centered by three radially positioned rails 2, establishing the offset space 12 and 8 providing a water flow passage for water entering at access ports 13 spaced about the circumference near the top of the housing 1. Within the housing 1 a tube 4 extends down leaving a space 9 above the inner base of filter 11. A reservoir and water passage 10 is formed between the inner tube 4 and filter 11 diverting the flow to access opening 9 from which the water flows together with water flowing in through the base axially toward the exit screen 15 through the granular media 3 filling the volume within center tube 4. The length and diameter of tube 4 is dictated by the water flow and residency requirement to achieve the performance required of the contained media 3. The housing base snaps on to the housing 1 as shown at 5. The filter assembly is then affixed to and made operatively connected to the bottle and bottle top by means of the threaded boss 16 and a mating threaded boss on the bottle cap.

Figure 2:
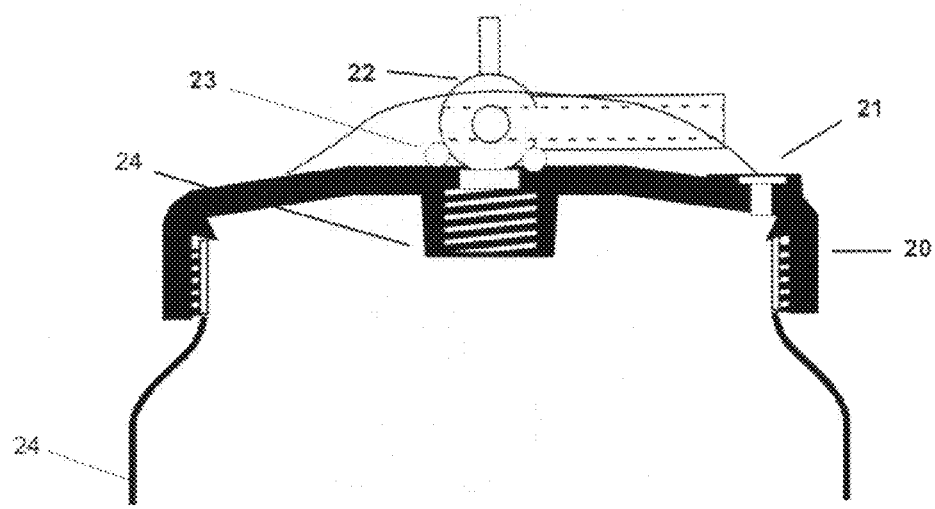
FIG. 2: Shows a Sport bottle Top configured with a centrally mounted rotating ball valve, an air-relief valve encapsulated within the top, and an internally threaded cylindrical boss extending from the inner base directly below and communicating with the pull-push valve above for securely engaging and providing a leak proof connection with a thread on water filter housing. The external surface of the boss is tapered at a locking angle to provide an optional means of securing a filter.

FIG. 2: Represents a Sport Bottle Cap 20 assembled to bottle 24 the cap containing a rotating ball valve 22, seal ring 23, and air relief valve 21 together with filter threaded securing boss 24 which accepts and holds the filter in place.

Figure 3:
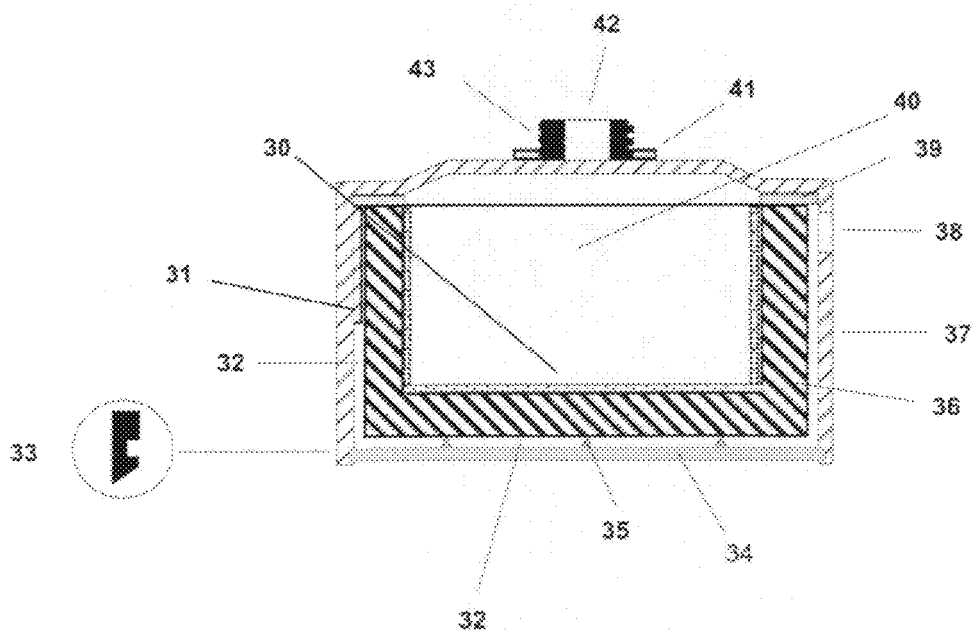
FIG. 3: Shows a dual flow carbon composite filter in a housing designed to be threaded to the bottle top with water entry near the top of the housing, offset from the housing sides and base to provide ease of water flow and access while forming a cup to retain water both within and without of the carbon filter during static periods of use. As in travel and sports use the bottle is frequently turned on its side during transport. When static and not being used to drink from, to retain the water within the hollow center of the filter the interior walls of the filter may be coated with a porous Teflon or other highly porous material possessing a negative angle of wetting to retain the treated water within the housing to preclude its draining out and into the bottle through the water entry ports.

FIG. 3: Visually describes the basic Dual Flow Filter 36 contained within outer housing and top 37 assembled to base 34 with filter offset posts 35, snapped and locked together by connection 33. To provide a water flow reservoir between filter 36 and housing 37 three offset and centering ribs 31 provide the 0.40"-0.10" free flow channel to all external surfaces of filter 36 to influent water entering at the (4) access ports 38. The top 42 of the housing 37 contains threaded boss 43 with large treated water exit port and leak seal 41. An elastomeric seal or potting compound 39 seals the filter 36 to the housing top 42 of housing 37. Another advantage of this design is the creation of a large internal water retaining reservoir 40 which in effect holds treated water ready for the next drink delivering water immediately and effortlessly. To enhance this feature the inner walls 30 of the filter 36 may be coated with a porous Teflon coating or similar material with a positive angle of wetting to retain the water should the filter within a bottle be laid on its side to preclude water from permeating out through the filter and returning to the bottle through the access ports 38.

Figure 4:
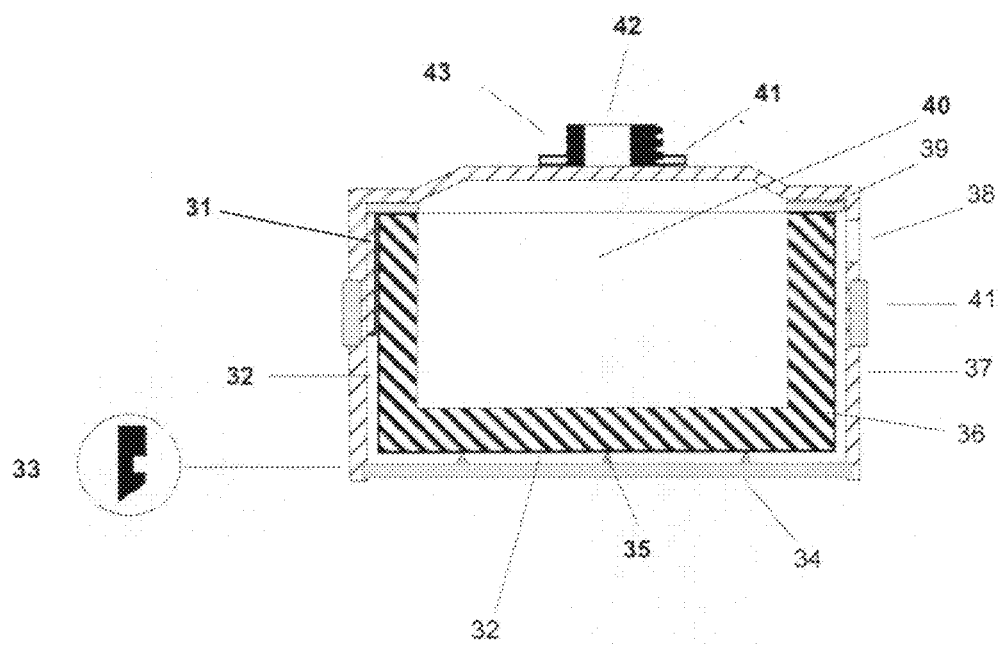
FIG. 4: Shows a filter similar to the filter in FIG. 3 but containing either two or four radially disposed pockets containing magnets the purpose of which is to decluster water for enhanced adsorption by the human body.

FIG. 4: Is a replicate of FIG. 3 with the exception of the housing 37 containing either two or four opposed magnets 41, preferably neodymium with a nickel coating and FDA approved plastic water protective coating. The magnets with a gauss rating of 2000-5000, preferably an N40 of about 4200 gauss and arranged in such manner as to create the strongest field within the path of water flow to effectively DeCluster the water molecules passing through the field for enhanced bio-availability for the user.

Figure 5:
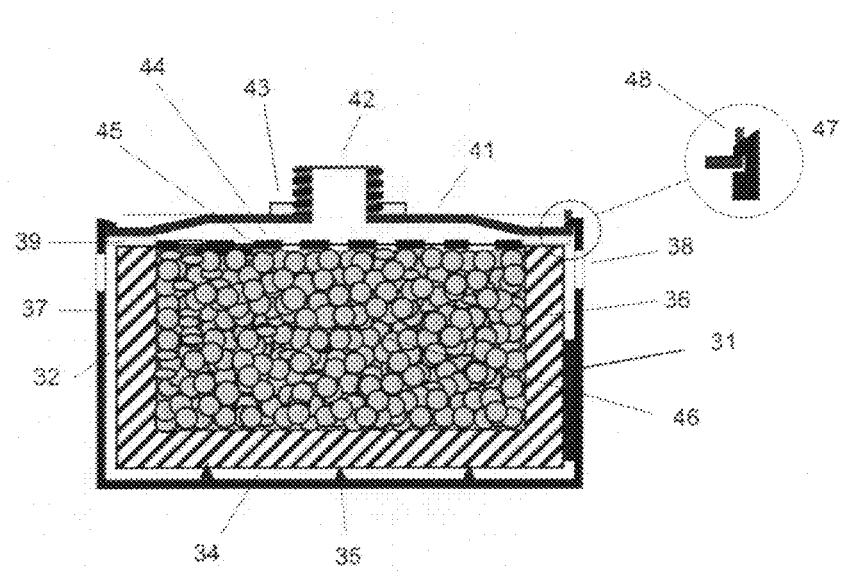
FIG. 5: Shows a dual flow carbon composite filter which also contains an ion exchange resin or any of a number of alternate treatment medias as well as porous beads which may be encapsulating and release a flavoring or other element desired to be released into the filtered water prior to drinking. The internal loose components are retained within the filter body under the domed housing to permit a water reservoir distribution area to be formed.

FIG. 5: Represents a very similar filter modified internally to house any one of a variety of different elements as depicted by number 46. The internal media 46 could consist of ion exchange resins, GAC, KDF, or other media covering a variety of purposes for example the removal of nitrates and heavy metals; a polymer extraction media for the removal of arsenic or radioactive contamination. The internal media 46 can also consist of porous plastic elements filled with flavoring or vitamins or compounds, which have water solubility and may be controlled as to the rate of release. The housing 37 is similarly configured with the exception that the open top of the housing has a locking slot 47 molded in to mate with the separate top 41 containing threaded top 42 and seal 43. A single locking pin 48 as shown in expanded view 47 locks into a slot in the housing 31 to eliminate the possibility of radial slippage when inserting or removing the filter from the bottle top. Molded into the base housing are wedged shaped stand-off and adjusting supports 35 providing an access reservoir 34 and access to the base of the carbon filter 36 by the pressurized water. One unique feature permitted by this dual flow design with a wide diameter, is to create a void and reservoir for water flow 44, above the media. The media is retained within the walls of the carbon composite element by a porous retaining screen over the annulus 45, covering the internal media; the external radial edges being solid and forming the seal 39. As in Drawing 3, the monolithic carbon composite element 36, is offset by three evenly spaced ribs 31, molded into the internal side of the housing 37.

Figure 6:
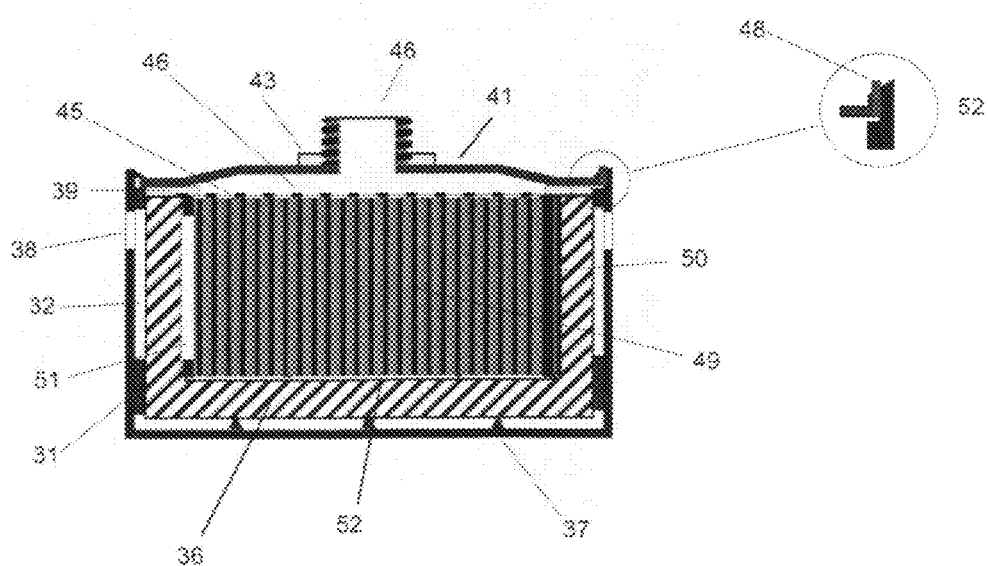
FIG. 6: Shows a dual access biological filter contained within an outer housing and the carbon composite filter within which an independent sub-micron hollow fiber membrane filter is positioned with water access from the side as well as from the base of the assembly. The housing of the hollow fiber 1-2 micron rated filter is open top and bottom with slits in the side wall for radial water access as well as axial water access up from the bottom exiting through the top.

FIG. 6: This design is essentially identical to Drawing 5 with the exception that within the center void of the monolithic carbon filter 43, is placed a sub micron hollow fiber membrane 49 of 1-2 micron pore size for the rejection of bacteria and protozoa. The hollow fiber membrane contains typically more than 30 square inches of surface area, has a pressure drop of from 2-10 psig, with the capability of withstanding as much pressure as may be applied by an individual; 15 psig, or more, in some instances. The hollow fiber membrane removes bacteria and protozoa through 6 logs, or 99.9999%, as verified by independent testing laboratories. The useful life is depending upon turbidity in the water, but with a turbidity level of 1 NTS, the filter will process approximately 80 gallons. The hollow fiber membrane component 49 is not an independently replaceable element, but is contained within its own housing 50, which is slid into place before the filter top 41 is attached forming a sealed unit. The hollow fiber membrane housing 50, contains side slits 51, covering the majority of the peripheral housing surface. Thus, as the housing 50 is completely open at the base, it is also open to the sides of the hollow fiber membrane elements 49. This provides for both radial and axial flow reducing the pressure required and providing improved water access to the hollow fiber membrane bundle. As the top sides of the hollow fiber membrane bundle, it is potted together 39 with the carbon filter 36, to the outer housing 37. It is not necessary to have a porous retainer over the hollow fiber membrane 49 as the top is solid except for the membranes which are miniature tubes through which the treated water flows. The equalization of water flow and force from the sides, radially, and from the base axially up through the filter and into the hollow fiber membrane housing enhance the applied pressure and resultant water flow. The void created by the design of the filter's top surface 46, provides a reservoir for water flow again minimizing resistance while at the same time providing an area into which to evacuate air that may otherwise be trapped.

Figure 7:
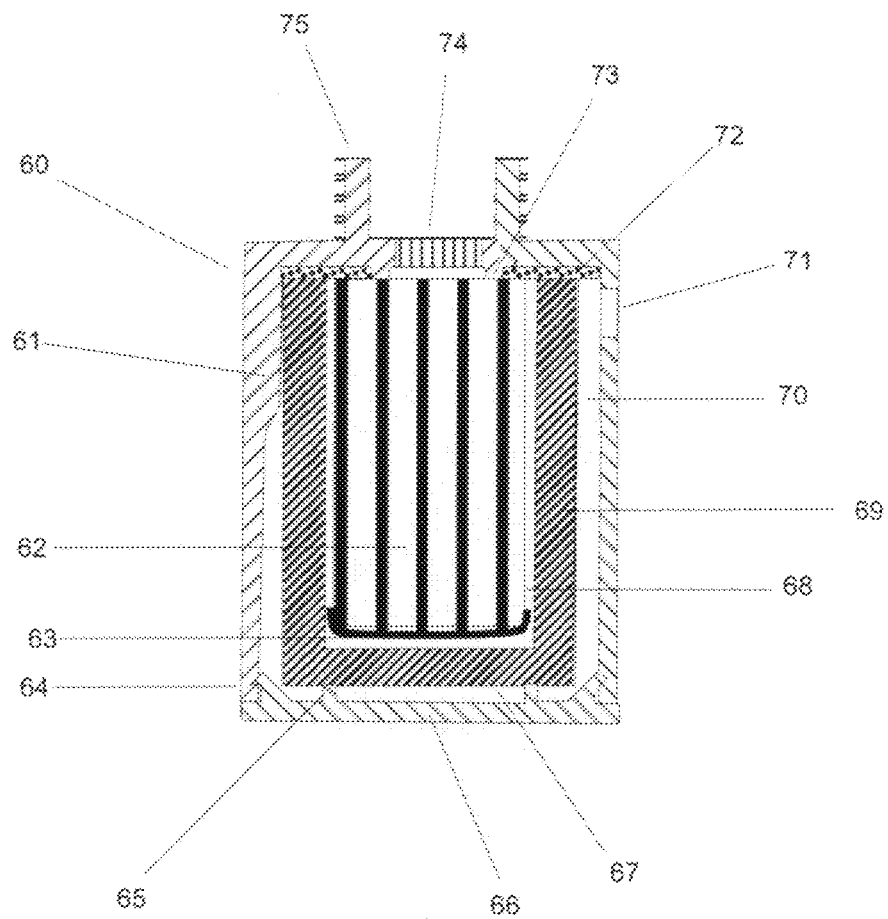
FIG. 7: Combines a Dual Flow carbon composite filter with an internally contained Charged Layered Membrane (CLM) filter both contained within an external housing. The pleated CLM filter has a separate base of the CLM media formed into a cup and potted to the CLM body; both the carbon filter and CLM filter are potted to the top of the filter housing. The internal CLM eliminates the problem of carbon fines in a metal bottle which is difficult to flush and also adds significant biological removal capability.

FIG. 7: Represents the marriage of two separate and complimenting filter technologies 69 and 62 contained within an outer housing 60 with base 66 with water access ports (4) 71. The outer housing 60 contains (3) offset rails 62 to center and space the carbon composite filter 69 from the inner housing 60 forming water flow channel 67 and 70 which are connected, one in the same. Inner filter 62 is a multi-pleated charged layered membrane (CLM) filter having 1-2 micron pores making up to 90% of the surface area. The pores are surrounded by nano alumina fibers bonded to microglass fibers exerting a ~50 millivolt positive charge at pH 7.2 attracting and retaining negatively charged particulate including biological contaminants. The CLM may also contain fine powdered activated carbon or, when used with a carbon based companion filter also contain a secondary substance. The CLM pleated cylinder 62 has a CLM base 63 bonded or potted together. The independent filters 69 and 62 are potted to the top of the housing 60 at 72; within a channel created by tray extensions 73 extending from the housing. Housing 60 also has molded in screen 74, and threaded boss 75 for attaching to a bottle top. As the CLM filter 63 is pleated it can fit snugly into the carbon filter 69 as water channels 68 are formed naturally by the pleats in the CLM 62. The carbon filter 69 is held off and away from the base 66 by pins 65 for axial water flow through the base of the carbon filter 69; such separation is not required between the inner base of the carbon filter 69 and the base of the CLM filter 63 as water may readily flow through base 63 directly from the base of filter 69. The outer housing 60 and base 66 are snapped and locked together at 64 extending around the circumference.

Figure 8:
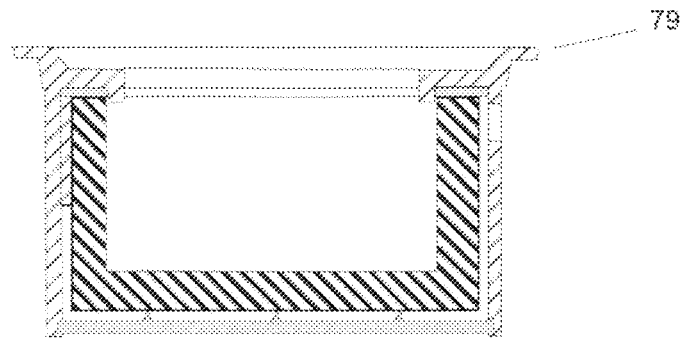
FIG. 8: Is a filter with identical characteristics to any of the other filters herein described with the exception that the filter housing contains a flange for resting upon the neck of a bottle becoming operatively connected to the bottle and cap when the cap is threaded onto the bottle affecting a seal.

FIG. 8: Is indicative of a filter identical to the filter described in FIG. 3 with the exception that the top has a flange 79 which extends over the neck of the bottle and the filter is secured in place and made operatively connected by the placement of a standard bottle top.

Figure 9:
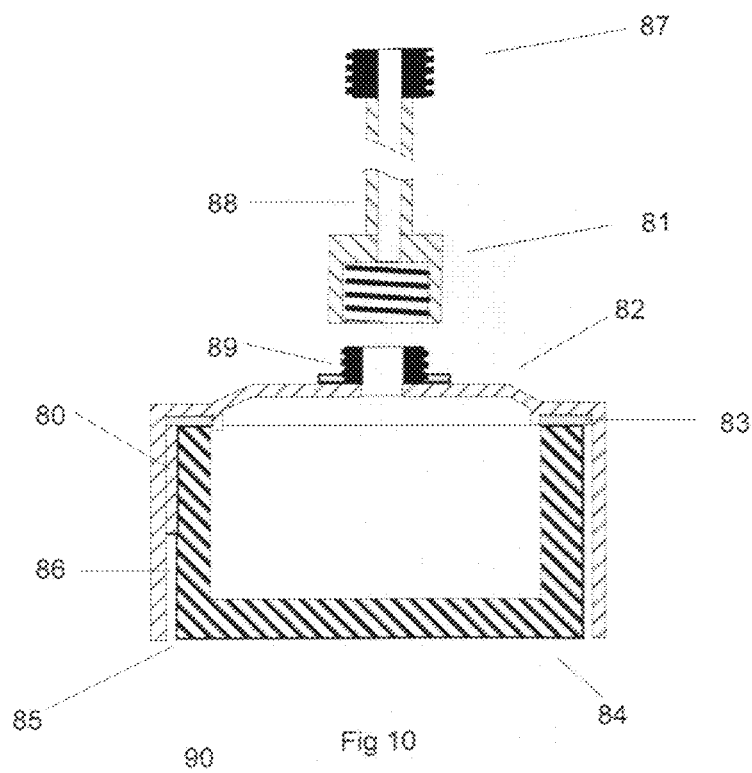
FIG. 9: Shows a filter of similar design with the exception of being designed to be used in an up-right position with the filter suspended near the bottom of the bottle by means of a tubular extension; the base of the carbon filter is exposed and the housing is designed to draw water up to the sides of the carbon filter for radial as well as the axial flow coming up through the base of the carbon filter.

FIG. 9: This drawing shows an alternative filter design, identical to the filter of drawing 3, but modified for mounting to a tube to permit the filter to be mounted at or close to the bottom of the container (bottle). The filter top 82, is designed to be attached to a tube 88 with threaded connecting upper end 87 which attaches to a bottle cap and lower threaded end 81 which threads onto the filter positioning the filter at the base of the bottle. Filter housing 82 has the carbon filter 84 bonded to the housing by adhesive potting compound 83. Housing 82 is open at the base exposing filter 84. Housing 82 is offset from the filter 84 by (3) offset and centering rails 80 which also forms the water access pathway 86 allowing water to encase the entire external surface of the filter 84 when water is drawn through the tube 88.

Figure 10:
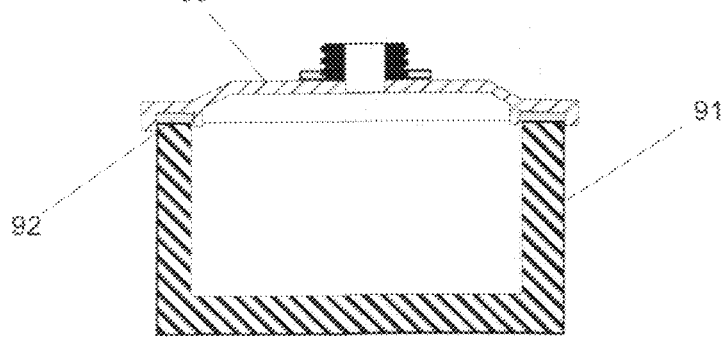
FIG. 10: Shows a carbon composite block filter mounted to the top housing without benefit of encapsulation within a full housing.

FIG. 10: Represents a plain dual aspect carbon filter which permits water flow through all surfaces in contact with water during the drinking cycle. The carbon composite filter 91 is bonded to the top housing 90 at 92. While this filter design is less expensive, it also lacks the features of being able to always have water available at all external surfaces until the bottle is close to empty. As soon as sufficient water has been drained from the bottle to leave a surface of the filter exposed while drinking, efficiency drops.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A filter for use in conjunction with a sport type bottle, the filter comprising: a carbon filter having walls and an integral base of carbon chosen from the class of carbon including monolithic carbon and carbon composite, the carbon filter having an available surface area with the integral base containing at least 5% of the total available surface area, the carbon filter having an open top end and the base being closed by carbon of equal thickness to the walls; a housing with a top, sides and a bottom encapsulating the carbon filter, the housing separated from the carbon filter by a ~0.04"-0.10" space permitting ready water access to all exposed surface area of the carbon filter; an inner tube having a top and a bottom contained in the housing, the inner tube being screened at the top and extending from the housing top with water access at the inner tube bottom adjacent to the base of the carbon filter, the inner tube housing granular media requiring axial flow for sufficient residence time to function properly; the granular media comprising alkalizing media to elevate the pH, the axial flow from the bottom of the inner tube providing a venturi effect aiding the radial flow of water from outside the inner tube to the base and into the inner tube, the housing becoming a water container as a cup with water entry ports near the top of the housing and a means to cooperatively connect the filter housing to a bottle top; the filter functioning with both axial and radial flow makes the filter a universal flow filter.

2. A filter as described in claim 1 wherein the housing containing centering and offset ribs extending from the sides of the housing and the housing base containing offset posts to support the carbon filter while establishing a void between the housing and the carbon filter.

3. A filter as described in claim 2 wherein the inner tube having external walls separated from the walls of the carbon filter by between 0.04-0.10 inches permitting the unimpeded redirectional flow of water to the bottom of the inner tube, the granular media comprising a media for alkalizing water from a pH of 7 to a pH of 9.5 while reducing the oxidation reduction potential by about 400 points, and mineralizing the water with the addition of calcium and magnesium; the same system being adaptable to other granulated medias as well.

4. A filter as described in claim 1 wherein the carbon filter further includes an interior coating of highly porous Teflon, presenting a negative angle of wetting to retain 10-30 cc's of water, after a first drinking cycle within the carbon filter in preparation for the next drinking cycle, yet permits the ready passage of water with the application of 1-2 psig of pressure.

\* \* \* \* \*